R. E. HELLMUND.
SYSTEM OF CONTROL FOR DYNAMO ELECTRIC MACHINES.
APPLICATION FILED FEB. 4, 1916.
1,347,903.
Patented July 27, 1920.
2 SHEETS—SHEET 1.
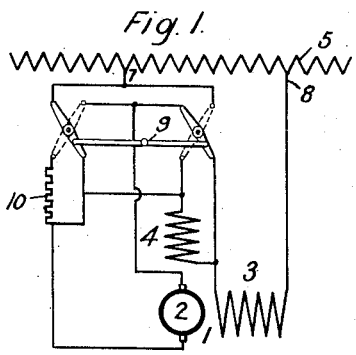
Fig. 1.
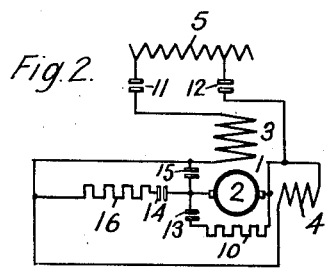
Fig. 2.
Fig. 3.
|  | 11 | 12 | 13 | 14 | 15 |
|---|---|---|---|---|---|
| Starting | O | O | O | | |
| Transition | O | O | O | O | |
| " | | O | O | | O |
| Running | O | O | | O | O |
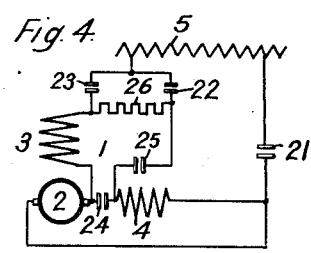
Fig. 4.
Fig. 5.
|  | 21 | 22 | 23 | 24 | 25 |
|---|---|---|---|---|---|
| Starting | O | O | | | O |
| Transition | O | O | O | | O |
| " | | O | | O | O |
| " | | O | | O | O |
| Running | O | | | O | O |
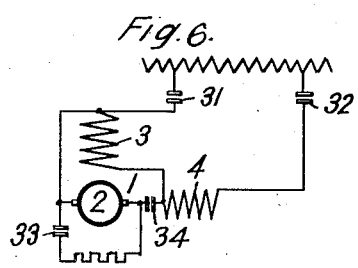
Fig. 6.
Fig. 7.
|  | 31 | 32 | 33 | 34 |
|---|---|---|---|---|
| Starting | O | O | O | |
| Transition | O | O | O | O |
| Running | O | O | | O |
WITNESSES:
Fred H. Miller
D. C. Davis
INVENTOR
Rudolf E. Hellmund
BY
Wesley G. Carr
ATTORNEY R. E. HELLMUND.
SYSTEM OF CONTROL FOR DYNAMO ELECTRIC MACHINES.
APPLICATION FILED FEB. 4, 1916.
1,347,903.
Patented July 27, 1920.
2 SHEETS—SHEET 2.
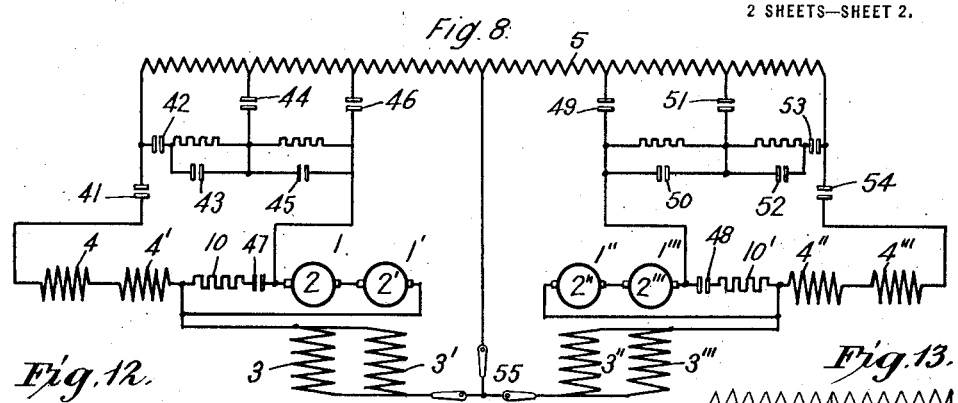
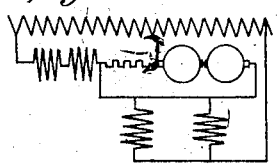
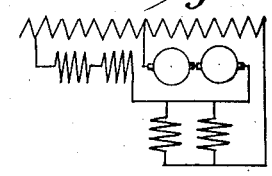
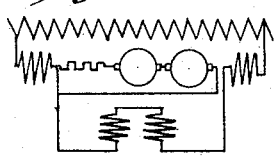
|   | 41 | 42 | 43 | 44 | 45 | 46 | 47 | 48 | 49 | 50 | 51 | 52 | 53 | 54 |
|---|----|----|----|----|----|----|----|----|----|----|----|----|----|----|
| A | o  |    |    |    |    |    | o  | o  |    |    |    |    |    | o  |
| B | o  |    |    |    |    | o  | o  |    |    |    |    |    |    | o  |
| C | o  |    |    |    |    | o  |    | o  |    |    |    |    |    | o  |
| D | o  |    |    | o  | o  |    |    | o  |    |    |    |    |    | o  |
| E | o  |    |    | o  | o  |    |    | o  |    |    |    |    |    | o  |
| F | o  |    |    | o  | o  |    |    |    |    |    | o  |    |    | o  |
| G | o  |    |    | o  | o  |    |    |    | o  | o  |    |    |    | o  |
| H | o  | o  |    | o  | o  |    |    |    | o  | o  |    |    |    | o  |
| I | o  | o  | o  |    | o  |    |    |    | o  | o  |    |    |    | o  |
| J | o  | o  | o  |    | o  |    |    |    | o  | o  |    | o  | o  |    |
| K | o  | o  | o  |    | o  |    |    |    |    | o  |    | o  | o  | o  |
Fig. 9.
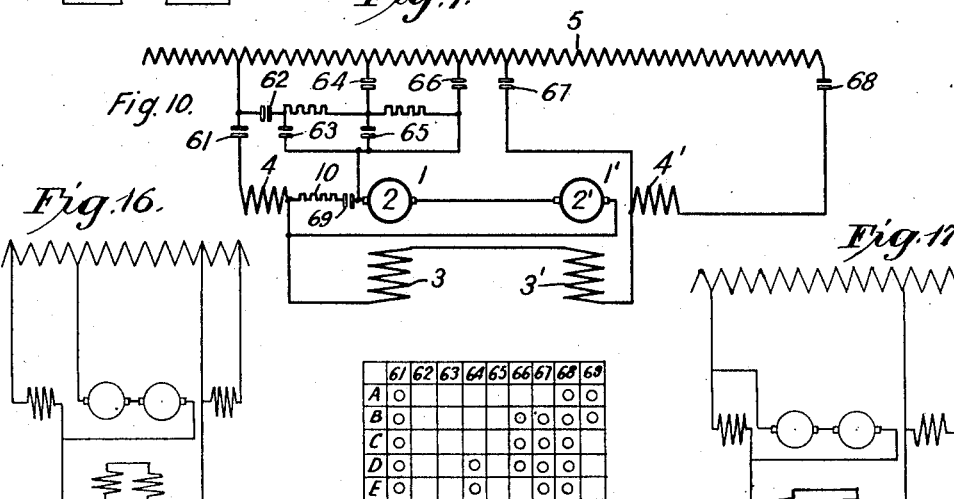
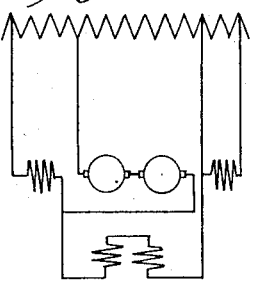
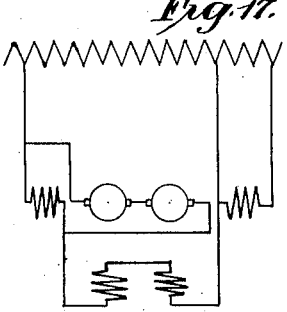
|   | 61 | 62 | 63 | 64 | 65 | 66 | 67 | 68 | 69 |
|---|----|----|----|----|----|----|----|----|----|
| A | o  |    |    |    |    |    |    | o  | o  |
| B | o  |    |    |    |    | o  | o  | o  |    |
| C | o  |    |    |    |    | o  |    | o  |    |
| D | o  |    |    |    | o  |    | o  | o  |    |
| E | o  |    |    |    | o  |    | o  | o  |    |
| F | o  |    |    |    | o  | o  |    | o  |    |
| G | o  |    | o  |    | o  | o  |    | o  |    |
| H | o  | o  |    |    |    | o  |    | o  |    |
| I | o  | o  | o  |    |    | o  |    | o  |    |
Fig. 11.
WITNESSES:
Fred H. Miller
D. C. Davis
INVENTOR
Rudolf E. Hellmund
BY
Wesley G. Carr
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL FOR DYNAMO-ELECTRIC MACHINES.

1,347,903. Specification of Letters Patent. Patented July 27, 1920.

Application filed February 4, 1916. Serial No. 76,153.

*To all whom it may concern:*

Be it known that I, RUDOLF E. HELLMUND, a subject of the Emperor of Germany, and a resident of Pittsburgh, in the county of Allegheny and State of Pennsylvania, have invented a new and useful Improvement in Systems of Control for Dynamo-Electric Machines, of which the following is a specification.

My invention relates to systems of acceleration for alternating-current commutator motors of the compensated type, and it has for its object to provide means whereby the strength of the various magnetic fields in a device of the character designated may be so manipulated as to provide smooth and uniform acceleration, with high torque and minimum sparking at each accelerating step.

In the accompanying drawing, Figure 1 is a diagrammatic view of an alternating-current motor of the compensated, commutator type, together with its attendant control and supply circuits, illustrating a preferred form of my system; Figs. 2, 4, 6, 8 and 10 are diagrammatic views illustrating modifications of the system shown in Fig. 1; Figs. 3, 5, 7, 9 and 11 are sequence charts setting forth the sequence of switch operation in the respectively associated systems; Figs. 12 and 13 diagrammatically illustrate the circuit connections that are established for the initial and final operating connections for Fig. 8; and Figs. 14 to 17, inclusive, illustrate circuit connections that are established for the control system shown in Fig. 10.

It is well known that, in starting an alternating-current, commutator motor, the strength of the exciting field should be much reduced in value in order to reduce the transformer action upon the short circuited armature coils undergoing commutation. In my copending application, Serial No. 810,764, filed Jan. 7, 1914, patented Sept. 17, 1918, No. 1,278,923, I disclose and claim an accelerating system wherein the cross-field winding is provided with substantially twice the number of turns of the armature winding and wherein the exciting field winding is first connected in series with the cross-field winding so as to be excited by the relatively weak current of the latter and be then connected in series relation with the armature winding so as to be excited by the relatively strong current thereof. The system of the present application is similar thereto in that, at starting the exciting field winding is connected in series with the cross-field winding so as to be energized by the relatively weak current thereof, but the present system radically differs from the system shown in the aforementioned application in that the exciting winding is subsequently excited by the sum of the currents flowing in the cross-field and armature windings. In this manner, not only is the desired strength imparted to the exciting field but also the phase of the different fields in the motor is so adjusted as to provide good torque and a minimum of sparking.

Referring to the accompanying drawings for a more detailed understanding of my invention, I show a motor of the compensated, commutator type at 1 in Fig. 1. The motor 1 is provided with an armature 2, with an exciting field winding 3 and with a cross field winding 4, and energy may be imparted thereto from a suitable source of alternating current, such, for example, as the secondary winding 5 of a transformer having its primary winding (not shown) connected to suitable supply mains. The connection between the motor 1 and the winding 5 is made through suitable taps 7 and 8 and a switch 9 of any suitable form. A resistor 10 is employed in starting, as will hereinafter more fully appear.

Having thus described the construction of a system embodying my invention, the operation is as follows. At starting, the switch 9 is thrown to the dotted line position, the exciting and cross-field windings 3 and 4 are connected in series relation between the taps 7 and 8 of the supply winding 5 and the armature 2 is short circuited through the resistor 10 for repulsion operation. As is well known in the art, the permissible current flow in the cross-field winding 4 is determined, in part, by the transformer action between the same and the armature winding 2, and, as it is customary to provide the cross-field winding in motors of the character described with substantially twice the number of turns that are provided in the armature winding, there is permitted but relatively small current flow through the cross-field winding 4 and, consequently, through the exciting field winding 3.

For subsequent operation, the switch 9 is thrown to the full-line position, whereupon the resistor 10 is eliminated and the motor is connected between the taps 7 and 8 with the armature and cross field windings connected in parallel and together supplying current to the exciting field winding, as required for the strong energization thereof at the higher speeds of operation.

The system of Fig. 2 is, in all the essential features of its operation, the same as that shown in Fig. 1 but, by the use of an additional resistor 16, and by the manipulation of the various switches in accordance with the sequence chart of Fig. 3, the transition may be made from repulsion operation to series operation without interruption of the load circuit, in a well known manner.

The system shown in Fig. 4 is constructed in accordance with the general priciples of my invention but, at starting, the exciting field winding is connected in series with the cross-field winding and, hence, receives a somewhat stronger initial excitation than is the case in the systems of Figs. 1 and 2, and, subsequently, the exciting field winding is energized with the sum of the armature and cross-field currents, as previously described.

In the system of Fig. 6, the motor is started by closing the switches 31, 32 and 33, whereupon the exciting and cross-field windings are connected in series across the source and the armature is short-circuited as described in connection with Fig. 1, but, in the running position, the switch 33 is opened and the switch 34 is closed, whereupon the armature 2 is short circuited across the exciting field winding. Thus, in the running position, the exciting field winding continues to receive the cross-field current and also receives the armature short-circuit current.

In systems of the character described, it is obvious that the total exciting field current is, in many cases, so large in amount as to require the provision of large, heavy and expensive switches for its control and I therefore show in Fig. 8 a system wherein the total exciting field current is not subjected directly to any switching operations but is rather controlled by the switching of its component parts, namely, of the current derived from the cross-field and from the armature circuits. Four motors 1, 1′, 1″ and 1‴ are employed, said motors being provided with armatures 2, 2′, 2″ and 2‴, respectively; with exciting field windings 3, 3′, 3″ and 3‴; and with cross field windings 4, 4′, 4″ and 4‴. The armatures 2 and 2′ and the armatures 2″ and 2‴ are permanently connected in series relation, as are also the cross-field windings 4 and 4′ and 4″ and 4‴. The exciting field windings 3 and 3′ are permanently connected in parallel with each other, as are also the exciting field windings 3″ and 3‴. At starting, the switches 41, 47, 48 and 54 are closed, as indicated in Fig. 9, and each of the exciting field windings receives substantially one-half of the cross-field current which, in turn, is substantially one-half the armature current because of the usual transformer ratio between the armature and cross-field windings, the armatures being short circuited for repulsion operation with current-limiting and phase-correcting resistors 10 and 10′ in series therewith. The switches 46 and 49 are then closed and the switches 47 and 48 opened, thus connecting the four armatures in series between the switches 46 and 49 while maintaining the series connection of the four cross-field windings between the switches 41 and 54. The sum of the armature and cross-field currents is passed through the exciting field windings, each of the latter receiving substantially one-half of said total current. The armature voltages are then raised to further accelerate the motor by the manipulation of the switches 42 to 45, inclusive, and 50 to 53, inclusive, until, in the final connection, the full voltage of the supply winding is connected across the four armatures in series, and the exciting field windings are energized by the resultant current, as before. Fig. 12 illustrates the initial operating connection for motors 1 and 1′, and Fig. 13 shows the final operating connection that is established. Only a single pair of motors is shown in view of the fact that the connections for both pairs of motors are identical. It will be observed that, by the above-described system, no accelerating switch is inserted in the exciting field circuit where it would be called upon to control the total current obtained by the vector addition of the armature and cross-field currents. I have shown certain switches at 55 in Fig. 8 which are included in the exciting field circuit but said switches are preferably of the knife type and are provided only for emergency operation in disconnecting a disabled motor and are never operated except when all current has been removed from the motors, as by the opening of a line switch or by lowering the trolley.

Another system wherein the switching of large exciting field currents is avoided is shown in Fig. 10. Two motors 1 and 1′, provided respectively with armature-exciting and cross-field windings designated as in the preceding figures, are connected to a supply winding 5. At the outset, by the closure of switches 61, 68 and 69, the maximum voltage obtainable from the supply winding is connected across all the cross and exciting field windings connected in series relation, and the armatures are short circuited through a resistor 10, as previously described and as illustrated in Fig. 14. The closure of the switches 66 and 67 (see Fig. 15) and the opening of the switch 69 then produce a small voltage across the armature windings, and the armature current is forced to traverse the exciting field winding in addition to the cross-field current as illustrated in Fig. 16. The cross-field winding 4' is separately excited for this connection. The voltage across the armatures is then increased by the manipulation of the switches 62 to 66, inclusive, while maintaining the previous arrangement, whereby all the armature and cross-field current is still passed through the exciting field windings. This final connection for the motors is illustrated in Fig. 17. Particular attention should be directed to the fact that, in all of the above-described systems, the supply of a portion of the exciting field current from the cross-field circuit and of a portion thereof from the armature circuit results in obtaining a substantial balance in the ratio of resistance to reactance in the various paths through the motor and, hence, insures better phase relations between the various currents and magnetic fluxes, thus promoting high torque and improving commutation.

While I have shown my invention in a plurality of distinct forms, it will be obvious to those skilled in the art that it is susceptible of various minor changes and modifications without departing from the spirit thereof, and I desire that only such limitations shall be placed thereupon as are imposed by the prior art or indicated in the appended claims.

I claim as my invention:

1. A system of control for a plurality of single-phase commutator motors each having an armature, an inducing-field winding, and a magnetizing winding, which comprises a transformer, switching means for connecting all of said windings in series relation across said transformer, switching means for connecting one of said inducing windings across a portion of said transformer, and switching means for connecting the armatures in series relation and for connecting the group of armatures in parallel relation with another of said inducing-field windings.

2. The combination with a transformer and a plurality of alternating-current commutator motors each having an armature, an inducing field winding, and an exciting-field winding, of a resistor, switching means for connecting all of said field windings in series relation across a portion of said transformer, switching means for connecting both of said armatures in series relation with said resistor, switching means for connecting one terminal of said resistor to one of said field windings and the other terminal of said resistor to an intermediate point of said transformer, switching means for connecting one of said inducing-field windings across a portion of said transformer, and switching means for eliminating said resistor from the motor circuit and for connecting said series-connected armatures in parallel relation with one of said inducing-field windings.

3. The combination with a transformer and an alternating-current commutator motor having an armature, an inducing-field winding and an exciting-field winding, of a resistor, switching means for permanently connecting said inducing and exciting-field windings in series relation across a portion of said transformer, switching means for connecting one terminal of said armature and said resistor to a point intermediate said field windings and for connecting the remaining terminals of said resistor and said armature to an intermediate point of said transformer, switching means for eliminating said resistor from said circuit and for connecting said armature in parallel relation with said inducing-field winding.

4. The combination with a transformer and an alternating-current commutator motor having an armature, an inducing-field winding and an exciting-field winding, said inducing winding having substantially twice as many turns as said armature, of switching means for connecting said inducing winding in series relation with said exciting winding and for subsequently connecting said armature and said inducing winding in parallel relation and connecting said exciting winding in series with said composite circuit for simultaneously changing the magnetizing field and the effective armature voltage.

In testimony whereof, I have hereunto subscribed my name this 28th day of Jan., 1916.

RUDOLF E. HELLMUND.